United States Patent [19]

McNamee

[11] Patent Number: 4,459,631
[45] Date of Patent: Jul. 10, 1984

[54] TRANSIENT OVER-VOLTAGE PROTECTION CIRCUIT

[75] Inventor: James W. McNamee, Warren, Ohio

[73] Assignee: General Motors Corporation, Detroit, Mich.

[21] Appl. No.: 437,197

[22] Filed: Oct. 28, 1982

[51] Int. Cl.³ .............................................. H02H 7/06
[52] U.S. Cl. ........................................ 361/21; 361/56; 361/91; 361/111; 361/194; 322/28
[58] Field of Search ........................ 361/21, 20, 56, 91, 361/106, 111, 210, 194; 322/25, 24, 23, 28, 73, 75; 307/200 A; 320/28, 32, 31, 33, 34, 71

[56] References Cited

U.S. PATENT DOCUMENTS

| | | | |
|---|---|---|---|
| 2,767,309 | 10/1956 | Schaner | 361/56 X |
| 3,314,001 | 4/1967 | Brockman | 322/73 |
| 3,332,006 | 7/1967 | Worrell et al. | 322/75 |
| 3,454,860 | 7/1969 | Burkett et al. | 320/28 |
| 3,488,560 | 1/1970 | Konopa | |
| 3,789,269 | 1/1974 | Holm et al. | |
| 3,943,408 | 3/1976 | Jakobs et al. | 361/56 X |
| 4,334,256 | 6/1982 | Mings | 361/56 |

Primary Examiner—Patrick R. Salce
Attorney, Agent, or Firm—C. R. Meland

[57] ABSTRACT

A transient over-voltage suppressor circuit for a motor vehicle power supply system that includes a diode-rectified alternating current generator. The suppressor circuit comprises a dual coil relay, a Zener diode and a small resistor having a positive temperature coefficient of resistance. The Zener diode and relay coils are connected across the output terminals of a bridge rectifier connected to the generator and when a transient over-voltage occurs the contacts of the relay are closed. When the relay contacts close they connect the resistor and one of the relay coils across the output terminals of the bridge rectifier. The relay contacts open when the resistance of the resistor increases to a predetermined value.

5 Claims, 1 Drawing Figure

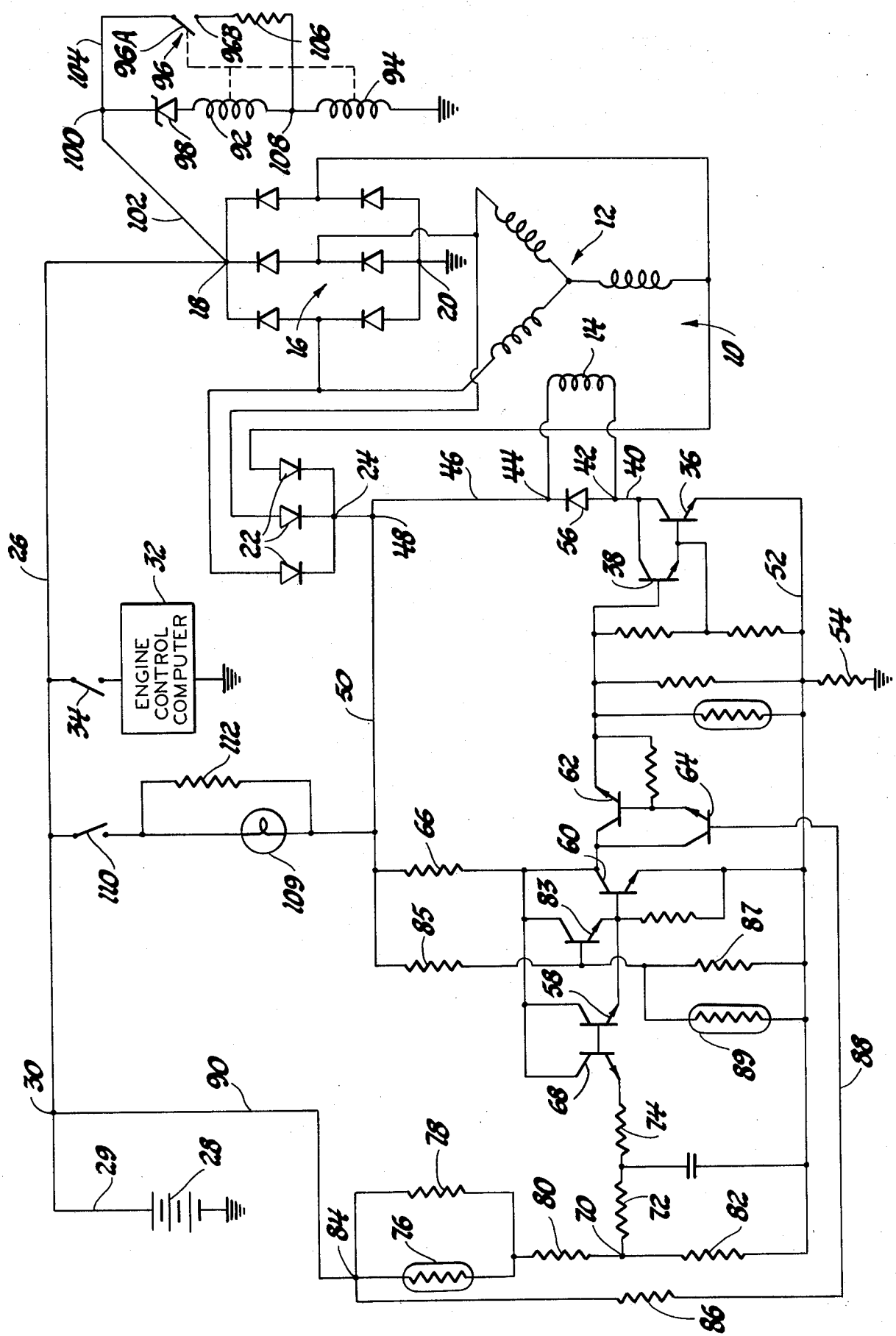

TRANSIENT OVER-VOLTAGE PROTECTION CIRCUIT

This invention relates to a transient over-voltage protection circuit for generator-regulating systems and more particularly to a transient over-voltage protection circuit for motor vehicle electrical systems.

A conventional motor vehicle electrical system includes a diode-rectified alternating current generator which supplies the motor vehicle electrical loads and charges the vehicle battery. The generator has a field winding, the excitation of which is controlled by a transistor voltage regulator which maintains the output voltage of the system at a desired regulated value.

In systems of the type that have been described it is possible for the system to experience a so-called load dump. This can occur, for example when the alternator is being driven at high speed, there is high alternator output current and a large change in load occurs, for example a disconnection of the vehicle battery from the alternator. When load dumping occurs the output voltage of the alternator can rise instantaneously to such a value as to destroy the semiconductor components of the voltage regulator and any other components of the system that cannot withstand a high voltage surge.

This load dumping phenomena is well known and circuits have been devised for protecting the electrical system when a load dump occurs. Examples of such circuits are those disclosed in the U.S. Pat. Nos. 3,488,560 to Konopa and 3,943,408 to Jakobs et al. In the Konopa patent the phase windings of the generator are respectively connected with controlled rectifiers which are biased conductive when a load dump occurs. In Jakobs et al. a controlled rectifier is connected between the neutral of a three phase Y-connected generator output winding and the negative terminal of the bridge rectifier. When a voltage transient of a predetermined magnitude occurs, indicative of a load dumping mode of operation, the controlled rectifier is gated conductive.

In contrast to the systems that have been described it is an object of this invention to provide a simple low cost load dump suppressor circuit which is connected across the direct current output terminals of the bridge rectifier that feeds the electrical loads on the vehicle including the battery. The suppressor circuit has a minimum number of components, that is a relay, a small resistor and a Zener diode. Since the suppressor circuit can be connected with the output terminals of the bridge rectifier it is not necessary to make electrical connections to the phase windings located internally of the alternator which simplifies the electrical connection of the suppressor circuit to the diode-rectified alternator.

Another object of this invention is to provide a load dump suppressing circuit which is connected across the output terminals of the bridge rectifier which, when actuated by a transient voltage, maintains the output voltage of the system at a value that is sufficient to properly energize vehicle electrical loads that require a minimum input voltage for normal operation. Thus, digital engine control computers, utilized on motor vehicles, may require at least a 7 volt input voltage to maintain normal operation. If input voltage drops below this value the computer may go into a resetting mode when system voltage returns to normal and may go into a bypass mode of operation when low input voltage occurs. The load dump suppressor circuit of this invention maintains the output voltage of the system in a range of 10 to 20 volts when a load dump occurs so that the engine control computer is not reset and is not placed in a bypass mode.

In carrying the foregoing objects forward the load dump suppressor circuit comprises a relay having two coils connected in series with a Zener diode and these circuit elements are connected across the direct current output terminals of the bridge rectifier. When a high transient voltage condition occurs, indicative of a load dump, the Zener diode breaks down energizing the relay coils. The energization of the relay coils cause the relay contacts to close to connect a small resistor having a positive temperature coefficient of resistance, and one of the coils of the relay across the output terminals of the bridge rectifier. The resistor places a load on the system which is of such a value as to limit generator output voltage to a safe value while maintaining the output voltage of the bridge rectifier to a voltage in the 10 to 20 volt range. In addition, the resistor provides a load for the battery in the event that the battery should become disconnected to cause the relay contacts to close and then becomes reconnected before the relay contacts open. The value of the resistor is such as to prevent damage to the electrical system by battery discharge current through the relay contacts and small resistor.

IN THE DRAWING

The single FIGURE drawing illustrates a motor vehicle electrical system having a load dumping suppressor circuit made in accordance with this invention.

Referring now to the drawing, the reference numeral 10 generally designates an alternating current generator having a three phase Y-connected output winding 12 and a field winding 14. The three phase Y-connected output winding is connected to the AC input terminals of a three phase full wave bridge rectifier designated by reference numeral 16 which has a positive direct current output terminal 18 and a negative grounded direct current output terminal 20. The phase windings of the generator are connected to a so-called diode trio comprised of three diodes 22, the cathodes of which are connected to a terminal 24. As is known to those skilled in the art the three diodes 22 and the diodes of the bridge rectifier 16, connected to grounded terminal 20, form a three phase full wave bridge rectifier for providing generator field excitation in a manner to be more fully described.

The motor vehicle electrical system includes a power supply conductor 26 that is connected to the positive output terminal 18 of the bridge rectifier. The power supply conductor feeds various loads on the motor vehicle including the storage battery 28. The battery 28 is connected to a junction 30 by battery cable 29 and junction 30 is connected to conductor 26. One of the loads on the motor vehicle is an engine control computer generally designated by reference numeral 32 which can be connected to power supply conductor 26 by a switch 34. The other power supply conductor of the system of course is the electrical ground of the motor vehicle. The output voltage appearing between conductor 26 and ground is regulated by a conventional transistor voltage regulator which, under normal conditions, maintains the voltage between conductor 26 and ground at a desired regulated value, for example 14 volts in a 12 volt system.

The voltage regulator is of a type disclosed in the U.S. Pat. to Harland et al., No. 3,597,654 and includes Darlington connected NPN transistors 36 and 38 connected in series with a conductor 40. The conductor 40 is connected to junction 42 and this junction is connected to one side of field winding 14. The opposite side of field winding 14 is connected to junction 44 which in turn is connected to a conductor 46. The junctions 42 and 44 represent the brushes and slip rings of the generator since the field winding 14 is carried by the rotor of the generator which is driven by the engine of a vehicle (not illustrated). The conductor 46 is connected to junction 48 and to conductor 50. The junction 48 is connected to junction 24 and therefore to the diode trio comprised of diodes 22. The field winding 14 can be energized via a circuit that can be traced from junction 24, junction 48, conductor 46, field winding 14, conductor 40, the collector-emitter path of transistor 36, conductor 52 and a small resistor 54, one end of which is connected to ground. The resistor 54 is approximately 0.02 ohms so conductor 52 is virtually at ground potential. The transistors 36 and 38 are switched on and off to control field excitation. Thus, when the voltage between conductor 26 and ground exceeds a desired regulated value the transistors 36 and 38 are switched nonconductive and when this voltage drops below a desired regulated value these transistors are switched conductive. A field discharge diode 56 is connected across the field winding 14.

The switching of transistors 36 and 38 is controlled by Darlington connected transistors 58 and 60. The collector of transistor 60 is connected to the base of transistor 38 via a semi-conductor switch comprised of Darlington connected transistors 62 and 64. Assuming the switch comprised of transistors 62 and 64 is conductive the collector voltage of transistor 60 is applied to the base of transistor 38 and as this voltage goes low transistors 36 and 38 are switched nonconductive and when this voltage goes high these transistors are switched conductive. The collector of transistor 60 is connected to conductor 50 via a resistor 66. The emitter-base circuit of NPN transistor 68 forms a Zener diode for the system. This Zener diode is connected to a junction 70 via resistors 72 and 74. The junction 70 is located on a voltage sensing voltage divider connected between junction 30 and ground. This voltage divider comprises a thermistor 76 paralleled by resistor 78, a resistor 80 and a resistor 82. The voltage divider develops a voltage at junction 70 which is a function of the voltage appearing between junction 30 and ground. When this voltage reaches a value indicative of the fact that voltage on conductor 26 is above the desired regulated value the Zener diode provided by transistor 68 breaks down biasing Darlington connected transistor 58 and 60 conductive. This causes transistors 38 and 36 to be biased nonconductive. As the output voltage now drops the Zener diode eventually resumes a blocking state therefore biasing transistors 58 and 60 nonconductive. This causes transistors 38 and 36 to be biased conductive completing an excitation circuit for the field winding. The continuous switching of transistors 36 and 38, under normal conditions, regulates the output voltage of the system to a desired value.

The base of transistor 64 is connected to a junction 84 via resistor 86 and conductor 88. When junction 84 is sensing battery voltage or bridge rectifier voltage it biases transistors 62 and 64 conductive to thereby connect the collector of transistor 60 to the base of transistor 38. In the event that conductor 90 should become disconnected from junction 30 the transistor 64 would receive no bias voltage and accordingly transistors 62 and 64 would be nonconductive to cut off base drive to transistors 38 and 36. This biases the system such that the field circuit is open since transistors 36 and 38 are biased non-conductive.

The transistor 83, together with resistors 85 and 87 and thermistor 89, forms an over-voltage protection circuit which is described in the above-referenced U.S. Pat. to Harland et al., No. 3,597,654. This circuit controls the switching of transistors 36 and 38 in the event that the voltage appearing at junction 48 goes higher than the desired regulated value, for example in the 19 to 30 volt range as explained in the above-referenced patent No. 3,597,654. This circuit is utilized to protect the system in the event that conductor 26 becomes disconnected from bridge rectifier output terminal 18.

The load dump suppressor circuit of this invention comprises a relay having coils 92 and 94. These two coils are wound on a common core and control relay contacts generally designated as 96 and comprised of a movable contact 96A and a fixed contact 96B. The relay contacts are held normally open by a spring which is not illustrated and the magnetic fields generated by the relay coils are additive. The relay coils 92 and 94 are connected in series with a Zener diode 98, one end of which is connected to junction 100. The junction 100 is connected to the positive direct current output terminal of the bridge rectifier 18 by a conductor 102. One side of the relay contacts 96 is connected to junction 100 via a conductor 104 and the opposite side of the relay contacts is connected to a resistor 106. The opposite end of resistor 106 is connected to a junction 108 located between relay coils 92 and 94 and one end of the relay coil 94 is grounded as illustrated.

The Zener diode has an inverse voltage break down rating of 24 volts and is a 50 watt device. The relative number of turns of the relay coils 92 and 94 is such that the relay coil 94 has a lesser number of turns and as an example relay coil 92 may have in the order of ten times the number of turns of relay coil 94. The resistor 106 has a resistance of approximately 0.2 ohms, for example at a temperature of 25° C. and has a positive temperature coefficient of resistance. Thus, the resistance of this resistor increases with increasing temperature such that the resistance increases, for example approximately 55% for each temperature increase of 100° C. The resistor may have a resistance of 0.2 ohms at 25° C. and its resistance will increase to approximately 0.65 ohms when it is energized and thus heated by $I^2R$ heating to a temperature of approximately 300° C. The resistor is of a nickel-iron composition which is wire wound on a glass core.

The operation of the transient voltage suppressing circuit will now be described, assuming that the motor vehicle electrical system is a 12 volt system and that the normal regulated voltage is approximately 14 volts. Assume now that a load dump occurs due to battery 28 becoming disconnected from conductor 26 by the disconnection of battery cable 29 from junction 30. This will cause a transient voltage pulse to be developed at bridge rectifier output terminals 18 and 20. Were it not for the suppressor circuit of this invention this transient voltage could go so high as to destroy components of the vehicle electrical system. The suppressor circuit of this invention will limit the transient voltage pulse to an amplitude of approximately 30 volts and then reduce it.

Thus, the transient voltage pulse may ramp up to about 30 volts from the 14 volt regulated value in two milliseconds. When the increasing transient voltage exceeds 24 volts the Zener diode 98 will break down. The total series resistance of coils 92 and 94 is about 120 milliohms and when Zener diode 98 breaks down relay coils 92 and 94 are energized. When the current through relay coils 92 and 94 reaches approximately 10 amps the relay contacts 96 close to connect the resistor 106 in series with relay coil 94 and thus across bridge rectifier output terminals 18 and 20. Current only flows through Zener diode 98 for a brief period of time so that the Zener diode will not fail during the brief current surge of 10 amps. When Zener diode 98 breaks down and contacts 96 close the bridge rectifier output voltage decreases sharply from a peak of about 30 volts to 10 volts due to the electrical loading of the generator provided by resistor 106 (0.2 ohms) and coil 94 which has a low resistance of about 0.01 ohms. When contacts 96 close resistor 106 is energized and its resistance increases and at this time the energized relay coil 94 operates as a holding coil to maintain the contacts 96 closed. As the resistance of resistor 106 is now increasing the output voltage of bridge rectifier 16 will increase as resistor 106 heats up and current through the holding coil 94 will decrease to a point where relay contacts 96 will eventually open. This may occur, for example when the current through relay holding coil 94 decreases to approximately 30 amps and may occur, for example in a time period of approximately 150 milliseconds after relay contacts 96 close. During the time relay contacts 96 are closed bridge rectifier output voltage increases from about 10 volts to 20 volts due to increasing resistance of resistor 106. When relay contacts 96 open the output voltage between junction 18 and ground may rise briefly and then decreases and eventually will drop to a value in which the transistor regulator will control system output voltage. With the battery disconnected the voltage applied to the regulator has a higher ripple content due to the loss of battery filtering action and the output voltage of the bridge rectifier is somewhat higher than the desired normal regulated voltage.

It is possible for the battery 28 to become disconnected from junction 30 to cause a transient load dumping voltage surge thereby causing contacts 96 to close and then become reconnected to junction 30 before contacts 96 open. If this occurs the battery 28, when it becomes reconnected, is connected in series with resistor 106 and relay coil 94 and therefore can supply discharge current through the resistor and coil. Under this condition of operation the resistor 106 limits battery discharge current to a value that will not destroy the electrical wiring and also increases its resistance to decrease battery discharge current.

From the foregoing it can be seen that the resistor 106 performs two important functions. First of all, when a load dump occurs the voltage between conductor 26 and ground is maintained at least as high as 10 volts so that resetting of the engine computer 32 will not occur. This is assuming that the minimum input voltage to computer 32, for normal operation, is 7 volts. Further, the resistor 106 limits battery discharge current in the event the battery 28 becomes reconnected to junction 30 at the time that relay contacts 96 are closed.

It will of course be appreciated that when a high voltage transient does occur the voltage regulator turns off transistors 36 and 38 as long as the transient voltage exceeds the desired regulated voltage of approximately 14 volts. When transistors 38 and 36 go nonconductive reactive field current flows through field discharge diode 56 in a known manner and decreases as a function of the inductance and resistance of field coil 14.

When relay contacts 96 close in response to a load dump, to connect resistor 106 across bridge rectifier output terminals 18 and 20, the magnetic energy stored in the alternator field is dissipated in the form of heat developed by resistor 106 due to current flow therethrough. The relay and the resistive characteristic of resistor 106 are such that bridge rectifier output voltage stays above 10 volts for the entire time period that relay contacts 96 are closed. Putting it another way, the transient voltage pulse is not completely dissipated at the time relay contacts 96 open.

In the foregoing description of the invention it was pointed out that a load dumping voltage transient can be produced when the battery is disconnected from the system. This can occur when the battery is being supplied with high charging current so that when it becomes disconnected there is a large reduction in load and when generator speed is high and alternator output current is high.

The system includes a conventional generator telltale signal lamp 109 connected with an ignition switch 110 and a resistor 112. These circuit elements are connected between conductor 26 and conductor 50. The circuit in a known manner provides initial field excitation to field winding 14 and indicates low generator voltage in the event the output voltage of the system drops below some value.

The embodiments of the invention in which an exclusive property or privilege is claimed are defined as follows:

1. An electric power generating system having transient over-voltage protection comprising, an alternating current generator having an output winding, rectifier means connected to said output winding having direct voltage output terminals for supplying direct voltage loads, a transient voltage suppressor circuit connected across said direct voltage output terminals of said rectifier means, said suppressor circuit comprising a power switching means and a resistor having a low resistance and a positive temperature coefficient of resistance connected in series across said rectifier direct voltage output terminals, a voltage responsive switching means connected across said rectifier output terminals which conducts when a transient rectifier output voltage is developed that exceeds a value indicative of an excess voltage condition, means responsive to conduction of said voltage responsive switching means for causing said power switching means to close to thereby connect said resistor across said rectifier direct voltage output terminals, holding means for maintaining said power switching means closed after it is operated closed by conduction of said voltage responsive means, and means responsive to an increase in resistance of said resistor for operating said holding means to a condition such that said power switching means is actuated to an open condition, the resistance of said resistor being such that rectifier output voltage amplitude is limited and maintained at a value at least above a predetermined minimum value during the time period that said power switching means is closed.

2. An electric power generating system having transient over-voltage protection comprising, an alternating current generator having an output winding, rectifier means connected to said output winding having direct voltage output terminals, a direct voltage load connected to said output terminals requiring at least a predetermined input voltage for normal operation, a transient voltage suppressor circuit connected across said direct voltage output terminals of said rectifier means, said suppressor circuit comprising a power switching means and a resistor having low resistance and a positive temperature coefficient of resistance connected in series across said direct voltage output terminals, a voltage responsive switching means connected across the output terminals of said rectifier means which conducts when a transient rectifier output voltage is developed that exceeds a value indicative of an excess voltage condition, means responsive to conduction of said voltage responsive switching means for causing said power switching means to close to thereby connect said resistor across the output terminals of said rectifier means, holding means for maintaining said power switching means closed after it is operated closed by conduction of said voltage responsive means, and means responsive to an increase in resistance of said resistor for operating said holding means to a condition such that said power switching means is actuated to an open condition, the resistance of said resistor being such that the output voltage of said rectifier means is reduced but maintained at above said predetermined input voltage required for normal operation of said load during the time period that said power switching means is closed.

3. An electric power generating system having transient over-voltage protection comprising, an alternating current generator having an output winding, rectifier means connected to said output winding having direct voltage output terminals for supplying direct voltage loads, a transient voltage suppressor circuit connected across said direct voltage output terminals of said rectifier means, said suppressor circuit comprising a relay having first and second actuating coils and contacts controlled by energization of the coils, a resistor having low resistance and a positive temperature coefficient of resistance, a voltage responsive switching means, means connecting said relay coils and said voltage responsive switching means in series across the output terminals of said rectifier means whereby said coils are energized to close the relay contacts when said voltage response switching means conducts, said voltage responsive switching means conducting when a voltage is applied thereto indicative of excess rectifier output voltage, a circuit connected across the output terminals of said rectifier means including in a series connection said relay contacts, said resistor and said second relay coil, the relay contacts and resistor shunting the voltage responsive switching means and first relay coil, the energization of said second relay coil by closure of said relay contacts maintaining said relay contacts closed, the resistance of said resistor being such that rectifier output voltage is reduced but maintained at least above a predetermined minimum value, said relay contacts opening when the resistance of said resistor increases to value reducing current to said second relay coil to a predetermined value.

4. A motor vehicle electrical system having transient over-voltage protection comprising, an alternating current generator having a polyphase output winding and a field winding, a polyphase full-wave bridge rectifier connected to said output winding having direct voltage output terminals, a storage battery connected to said rectifier output terminals, voltage regulating means connected to said field winding and rectifier for maintaining the voltage applied to the battery at a desired regulated value during normal operating conditions, a transient voltage suppressor circuit connected across said direct voltage output terminals of said rectifier for limiting the amplitude of transient voltage surges that may occur at said output terminals as a result of said battery being disconnected from said output terminals, said suppressor circuit comprising a relay having first and second actuating coils and contacts controlled by energization of the coils, a resistor having low resistance and a positive temperature coefficient of resistance, a voltage responsive switching means, means connecting said relay coils and said voltage responsive switching means in series across the output terminals of said rectifier whereby said coils are engergized to close the relay contacts when said voltage responsive switching means conducts, said voltage responsive switching means conducting when a voltage is applied thereto indicative of transient excess rectifier output voltage which is substantially higher than said desired regulated value, a circuit connected across the output terminals of said rectifier including in a series a connection said relay contacts, said resistor and said second relay coil, the relay contacts and resistor shunting the voltage responsive switching means and first relay coil, the energization of said second relay coil by closure of said relay contacts maintaining said relay contacts closed, the resistance of said resistor being such that rectifier output voltage is limited and maintained at least above a predetermined minimum value, said relay contacts opening when the resistance of said resistor increases to a value reducing current to said second relay coil to a predetermined value.

5. A power generating system for a motor vehicle comprising, an alternating current generator having a polyphase output winding, a polyphase full wave bridge rectifier having AC input terminals connected to said output winding and direct voltage output terminals, power supply conductors connected to said output terminals for feeding vehicle direct voltage loads including the vehicle storage battery, and a voltage transient suppressor circuit connected across said rectifier output terminals, said suppressor circuit comprising a relay having first and second actuating coils and contacts controlled by energization of the coils, a resistor having low resistance and a positive temperature coefficient of resistance, a Zener diode, means connecting said Zener diode and said relay coils in series and across said rectifier output terminals, the breakdown voltage of said Zener diode being such that it breaks down to energize said relay coils to cause said relay contacts to close when rectifier output voltage is excessive, a circuit connected across said rectifier output terminals including in a series connection said relay contacts, said resistor and said second relay coil, said relay contacts and resistor shunting said Zener diode and first relay coil, the resistance of said resistor increasing to reduce current through said second relay coil to a value that permits opening of said relay contacts and being of such a value as to limit battery discharge current to a value that will not damage system wiring in the event that the battery becomes disconnected from the system to cause closure of said relay contacts and becomes reconnected to the system when said relay contacts are closed.

* * * * *